(12) United States Patent
de Kock

(10) Patent No.: US 8,307,964 B2
(45) Date of Patent: Nov. 13, 2012

(54) LOW-NOISE SHOCK ABSORBER

(75) Inventor: Paul de Kock, Numansdorp (NL)

(73) Assignee: Koni B.V., Oud Beijerland (NL)

( * ) Notice: Subject to any disclaimer, the term of this patent is extended or adjusted under 35 U.S.C. 154(b) by 581 days.

(21) Appl. No.: 12/497,032

(22) Filed: Jul. 2, 2009

(65) Prior Publication Data

US 2010/0000832 A1    Jan. 7, 2010

(30) Foreign Application Priority Data

Jul. 2, 2008 (EP) ..................... 08159500

(51) Int. Cl.
*F16F 9/348* (2006.01)
*F16F 9/516* (2006.01)

(52) U.S. Cl. ................. 188/282.6; 188/322.15; 188/317

(58) Field of Classification Search ............... 188/282.5, 188/282.6, 322.15, 313, 316, 317
See application file for complete search history.

(56) References Cited

U.S. PATENT DOCUMENTS

| | | | |
|---|---|---|---|
| 4,819,773 A * | 4/1989 | Ito et al. ................. | 188/282.5 |
| 5,755,305 A | 5/1998 | Deferme et al. | |
| 5,855,258 A | 1/1999 | Deferme | |
| 2005/0211087 A1 | 9/2005 | Dourson et al. | |
| 2006/0185948 A1 | 8/2006 | Schmitt | |

FOREIGN PATENT DOCUMENTS

| | | |
|---|---|---|
| FR | 2 882 412 | 8/2006 |
| JP | 60-129442 | 7/1985 |

OTHER PUBLICATIONS

European Search Report dated Nov. 6, 2008, from corresponding European patent application.

* cited by examiner

*Primary Examiner* — Thomas J Williams
(74) *Attorney, Agent, or Firm* — Young & Thompson

(57) ABSTRACT

Shock absorber provided with a piston having a number of constantly open connecting channels which connect the two sides of the piston, and having a number of connecting channels to be opened and closed by element of a valve. The valve includes a plate valve which under the influence of flow therethrough, i.e. the pressure difference over the piston, on the outward movement of the shock absorber can be closed to a greater or lesser extent. On the inward movement, unimpeded flow of fluid through the piston can occur. A flow-through path is bounded by the corresponding connecting channels and the valve together with the upper side of the piston. In the rest position there is a flow-through possibility for fluid when the shock absorber fixings move away from each other, and when the shock absorber fixings move away from each other more quickly the flow-through cross section gradually decreases until the valve closes completely.

16 Claims, 3 Drawing Sheets

LOW-NOISE SHOCK ABSORBER

The present invention relates to a hydraulic shock absorber, comprising a piston with piston rod, said piston rod being provided with connecting means for fixing to a part of a vehicle, and comprising a cylinder which accommodates the piston and on the side away from the piston rod is provided with connecting means for fixing to another part of a vehicle, said piston being provided with a number of connecting channels extending towards the piston rod in order to provide fluid communication between opposite sides of the piston, a plate-type valve which closes off said connecting channels being present on one side of the piston, said valve being fitted in such a way that on movement towards each other of said connecting means fluid flows through said channels when said plate-type valve opens and on movement away from each other of said connecting means said valve at least partially closes off the openings of said connecting channels, wherein in the rest position without fluid flow said valve partially clears said openings.

Such a shock absorber is generally known in the prior art. An example is US 2005/0211087. In this case the piston is provided with connecting channels which can be closed off by means of a valve plate, which in the rest position gives a clear flow-through opening for the fluid to be displaced. Under the influence of the fluid flow or the pressure difference, such a plate-type valve can be opened further and closed further respectively.

It is the object of the present invention to provide a shock absorber that gives the occupant of a vehicle on which said shock absorber is fitted a comfortable ride, and this relates not only to the accelerations and decelerations to which the person in the vehicle is exposed, but also to the noise experienced. It has in fact been found that some of the rolling noise is transmitted through the shock absorber to the body of a vehicle.

This object is achieved in a shock absorber as described above in that said plate-type valve comprises an opening lying at a radial distance from the opening of the connecting channel to be closed off by the valve, and wherein in the partially opened state the flow path for fluid extends between said opening in the plate-type valve and the space defined between the plate-type valve and the piston and said opening in said connecting channel.

According to the present invention, whilst in the rest position a clear flow-through opening is present between the two sides of the piston, said opening—unlike the prior art—is not produced by the fact that the plate-type part is lying with its free end clear so that the flow can move along the free end in the rest position.

According to the present invention, the plate-type valve is embodied in such a way that in the rest position said valve closes off at the free end part. The flow possibility in the rest position is achieved by a space lying between the free end of the plate-type valve and clamping point of the plate-type valve and the opposite free end surface of the piston. In other words, the plate-type valve contains a separate opening which functions, inter alia, for the passage of the flow in the rest position. This embodiment provides numerous possibilities for adjusting the damping characteristic, and it has also been found that in this way the transmission of rolling noises to the body of the vehicle is considerably reduced.

The construction of the plate-type valve is such that when an outward movement is performed, i.e. when the fixings of piston rod and cylinder move away from each other when there is increased flow, the abovementioned space between the plate-type valve and end face of the piston becomes smaller, with the result that the fluid flow is throttled. This reduction in the cross section will ultimately result in full closure. Such a movement is performed gradually, i.e. it is a matter of a sort of closing movement. The closing movement can be influenced further by possibly providing a separate seat edge at the opening of the connecting channel concerned. On the other hand, when there is an inward movement of the shock absorber, i.e. the fixings of piston rod and cylinder move towards each other, not only will the abovementioned space be increased, but the free end will also come away from the piston, with the result that fluid can flow in two directions through the channel concerned and in practice little or no flow resistance is encountered.

Apart from the connecting channel described here, which can be closed off by means of the valve, a further connecting channel that is always open (constant) can be present.

It is possible to provide a number of such connecting channels which are closed with a plate-type valve. In such a case a common plate-type valve is preferably present. The connecting channels concerned in such an embodiment are preferably provided around the periphery of the piston, while the clamping point of the common connecting plate lies nearer to the centre of the piston.

By varying the centre-to-centre distance from the connecting channels to the piston, and/or the clamping point of the plate-type valve relative to the centre of the piston or the positioning of the supporting point of the free end of the plate-type valve, it can be effected that the opening characteristic is not the same for every connecting channel or its corresponding opening. In this way it is possible to provide a further gradual increase and reduction of the flow-through cross-sectional surface area.

In the case of the embodiment described above, in which, in addition to the connecting channels, further connecting channels which are open constantly are present, it is possible to embody and position the opening in the plate-type valve in such a way that said opening likewise serves as an opening for such further channels.

The construction described above is simple to achieve by fitting the connecting channels concerned in the piston and then, for example by means of the piston rod, clamping the plate-type valve on them.

According to a particular embodiment of the present invention, the plate-type valve is embodied in such a way that the part lying between the opening provided in it and the part of the plate-type valve that closes off the opening of the connecting channels performs a rolling movement when it opens. Such a rolling movement means that there is no longer the risk of the valve becoming stuck. Another characterizing feature of the present invention is the gradual closure again when the flow changes.

The invention will be explained in greater detail below with reference to an exemplary embodiment illustrated in the appended drawing, in which.

Figure 1:
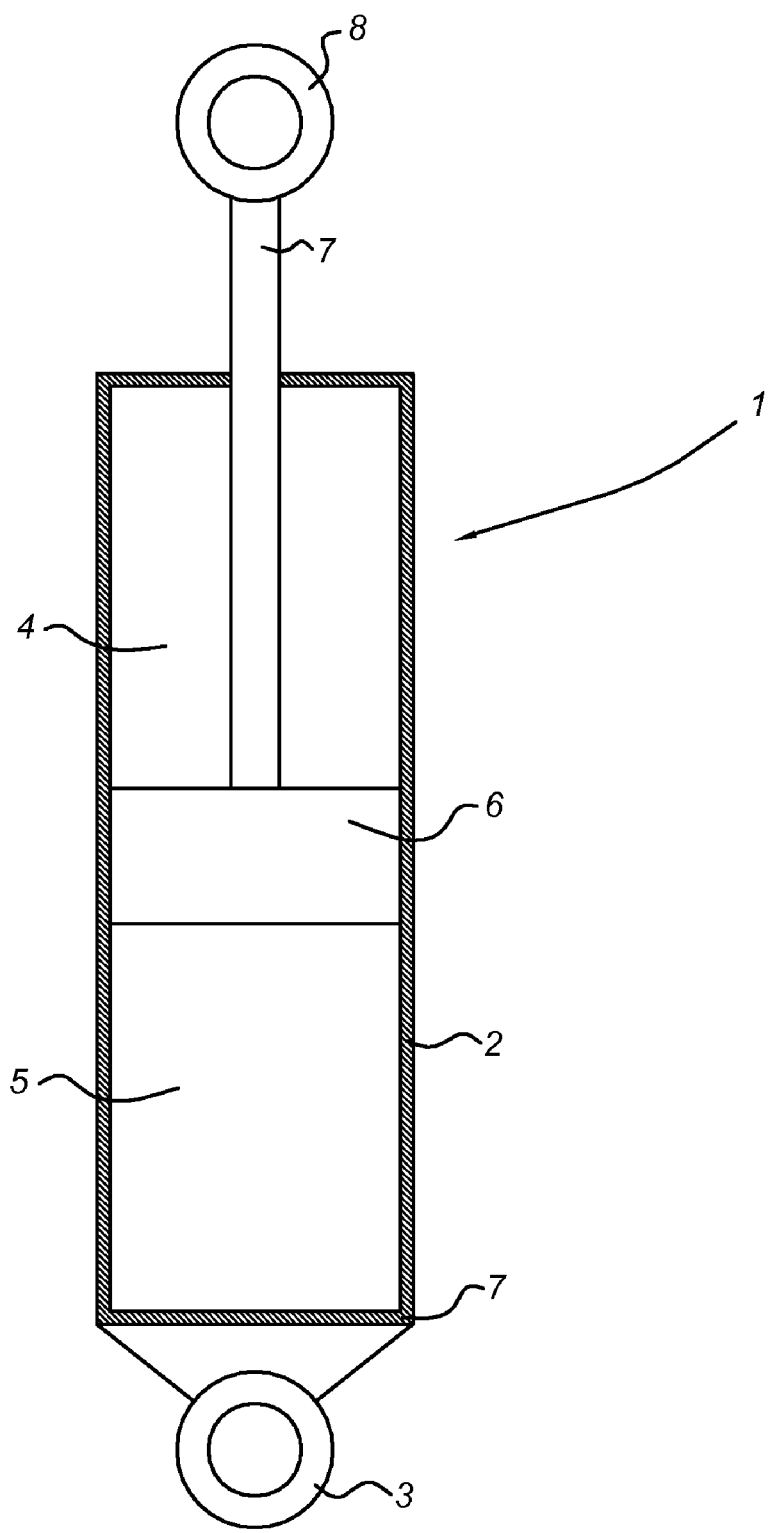
FIG. 1 shows diagrammatically the structure of a shock absorber.

The shock absorber according to the invention is shown in its entirety by 1 in FIG. 1. This shock absorber in the usual manner comprises a cylinder 2, which is provided with a fixing 3 for connection to a vehicle body. A piston 6 which divides the cylinder into a chamber 4 and a chamber 5 is present. Piston 6 is connected to a piston rod 7, which is likewise provided with a fixing 8 for connection to another vehicle part.

Figure 2:
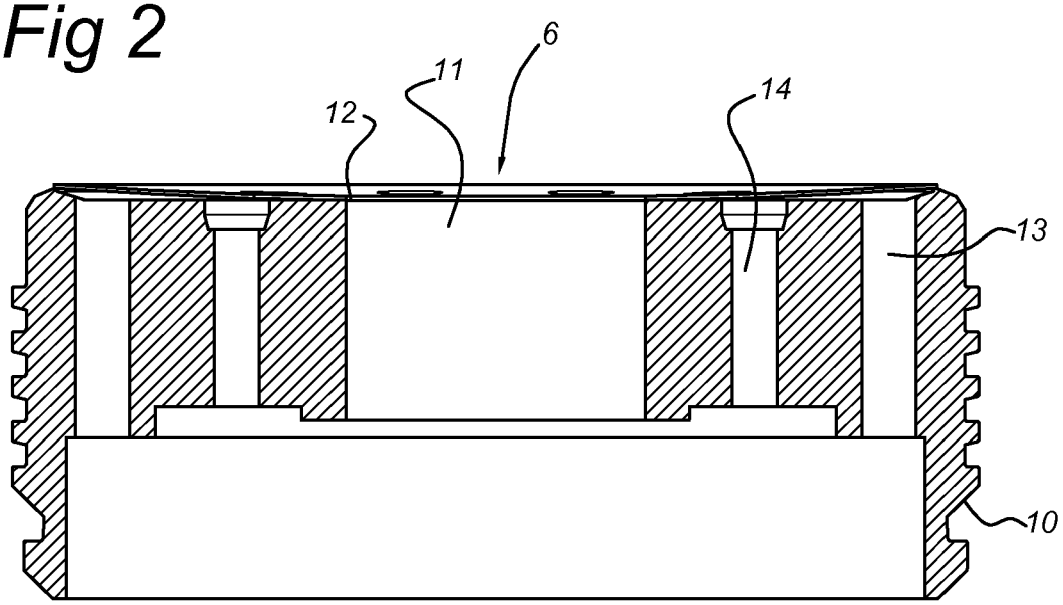
FIG. 2 shows in detail the piston used in the shock absorber in FIG. 1, in cross section.
Figure 3:
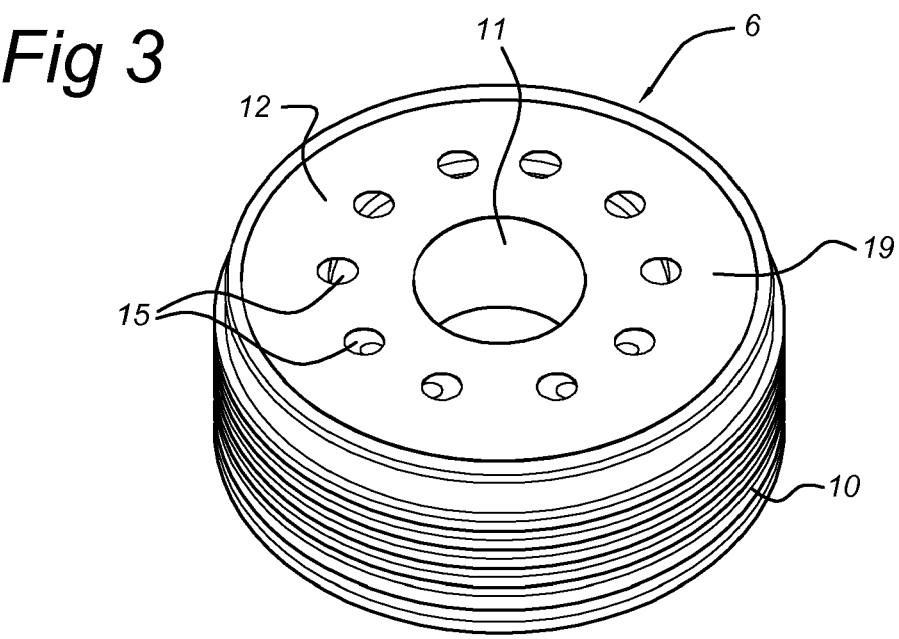
FIG. 3 shows in perspective the piston shown in FIG. 2.

Details of the piston can be seen in FIG. 2 and the remaining figures. It is clear from these figures that the piston 6 comprises a piston wall 10 and a central opening 11 for accommodating the piston rod 7 (not shown in any further detail).

A plate valve 12, in the form of a thin metal part provided with openings 15, is present. Connecting channels 13, always with an outflow opening 17, are present in the piston body. Further connecting channels 14, each with an outflow opening 16, are also present. Outflow opening 16 is in the form of a circular groove.

Figure 4:
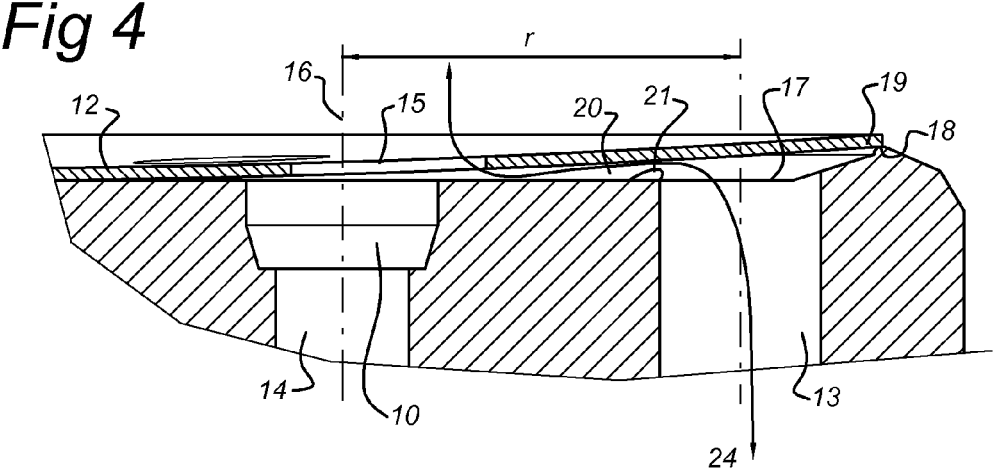
FIGS. 4-6 show a detail of the piston in the various flow-through situations to which the shock absorber is subjected.
Figure 5:
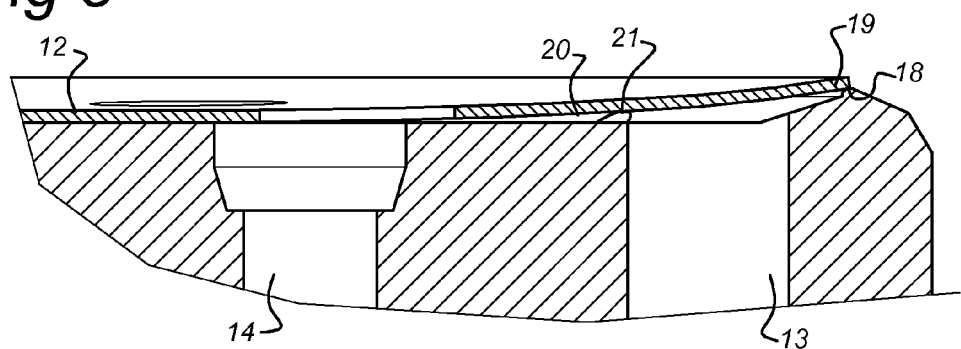
Figure 6:
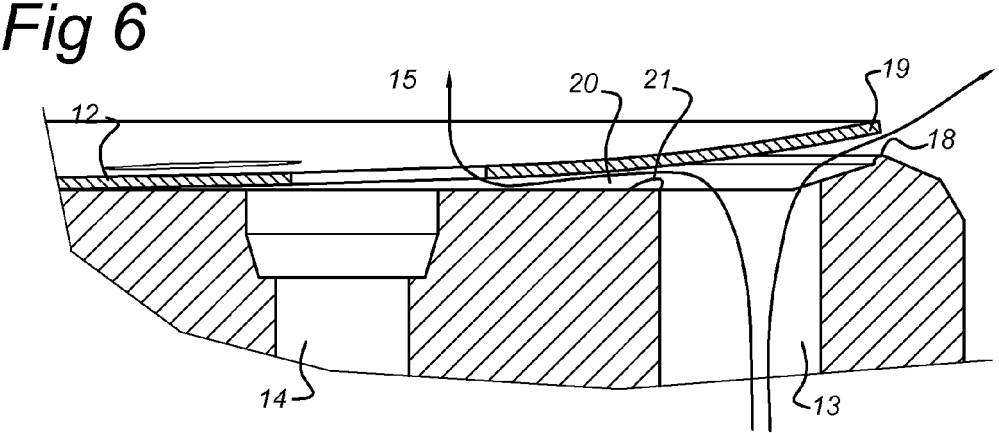

It can be seen from the details of FIGS. 4-6 that the plate-type valve 12 is clamped near the centre of the piston against its head end. The free end 19 of the valve plate rests upon a seat 18 in the form of a single edge or thickening of the periphery around the piston. A further peripheral edge 21 is present further inwards, adjacent to opening 17.

The distance between the centre of the opening 17 and the centre of the opening 16 is indicated by r in FIG. 4, and is at least several millimeters.

FIG. 4 shows the rest position. It is clear from this figure that the free end 19 in that case is resting upon the seat 18, while space is present between seat 21 and plate valve 12. In other words, between the head end face of the piston and the plate valve there is a flow-through space 20 through which fluid can flow as indicated by arrow 24. This flow can be in two directions.

FIG. 5 shows the situation of the fixings 3 and 8 moving away from each other. Because of the pressure difference or great flow, the plate valve 12 will be forced in the direction of seat 21 and will ultimately gradually close on it. FIG. 5 shows the situation of complete closure. This means that the connecting channels 13 can no longer convey fluid. It should be understood that going from FIG. 4 to FIG. 5 the closing action of channels 13 takes place gradually, which the occupant of the vehicle finds very comfortable. Irrespective of the position of the plate valve 12 near seat 21, flow will always be able to occur through constantly open channel 14 (constant), i.e. the further connecting channel 14.

FIG. 6 shows the opposite situation, namely the situation when the fixings 3 and 8 move towards each other. In that case the pressure difference or the flow will cause the free end 19 of the plate valve to come away from the seat 18, so that the fluid can flow in two directions through connecting channel 13, as indicated by arrows 15 and 16. The opening movement of the plate-type valve 12 occurs as a sort of rolling movement, so that the valve is prevented from sticking and direct response to the changed flow conditions is obtained.

By changing the size of the various openings of the channels 13, openings 17 and openings 15 respectively, positioning of the openings 17 relative to the openings 15 and not centrally applying the pre-load force to the plate valve 12, it can be ensured that the opening or closing characteristic of the plate valve relative to the seats 21 and 18 for each connecting channel 13 is different, which further contributes to the gradual changing of the flow conditions through the piston according to the present invention,.

The construction described above is easy to manufacture and involves little cost. Furthermore, it is very reliable, so that it is extremely advantageous to use this construction.

On reading the above description, the person skilled in the art will immediately think of variants which lie within the scope of the appended claims and are obvious in the light of the above.

The invention claimed is:

1. Hydraulic shock absorber, comprising a piston with a piston rod, said piston rod being provided with connecting means for fixing to a part of a vehicle, and comprising a cylinder which accommodates the piston and on the side away from the piston rod is provided with further connecting means for fixing to another part of said vehicle, said piston being provided with a number of connecting channels extending towards the piston rod in order to provide fluid communication between opposite sides of the piston, a plate valve being present on one side of the piston and provided over said connecting channels, said valve being fitted in such a way that i) on movement towards each other of said connecting means and said further connecting means, fluid flows through said channels when said plate valve opens, and ii) on movement away from each other of said connecting means and said further connecting means, said valve completely closes off an opening of each of said connecting channels,
wherein, in a rest position without fluid flow between the opposite sides of the piston, said valve partially clears said openings,
wherein said plate valve comprises an opening which lies at a radial distance from the opening of the connecting channel to be closed off by the valve, and
wherein, in the partially opened state of the rest position, a flow path for fluid extends between said opening in the plate valve and a space defined between the plate valve and the piston and said opening in said connecting channel.

2. Shock absorber according to claim 1, wherein said plate valve has a free end which in the rest position rests on a valve seat of said piston and moves away from said valve seat when said connecting means and said further connecting means move towards each other.

3. Shock absorber according to claim 1, comprising said number of connecting channels being fitted in such a way in combination with the plate valve that on a certain movement of the piston relative to the cylinder, with the same embodiment of the connecting channels and the openings of said channels and with the same embodiment of the corresponding openings in the plate valve, a different flow quantity is produced for different connecting channels.

4. Shock absorber according to claim 1, comprising said number of connecting channels provided around the periphery of said piston and having for said connecting channels a common plate valve which is clamped against the piston more towards the centre of the piston.

5. Shock absorber according to claim 4, wherein the distance from the clamping point of the plate valve on the piston to the opening of the connecting channel is different for two connecting channels.

6. Shock absorber according to claim 1, wherein said piston comprises further connecting channels which cannot be closed off.

7. Shock absorber according to claim 6, wherein said opening in said plate valve at least partially coincides with an outflow/inflow opening in said further connecting channels.

8. Shock absorber according to claim 1, wherein in the part lying between the opening in said plate valve and the part of the plate valve that closes off said openings of said connecting channels, said plate valve performs a rolling movement when opening.

9. Hydraulic shock absorber, comprising:
a cylinder (2);
a first fixing (3) for connection of the cylinder to a first vehicle part;

a piston (6) which divides the cylinder into a first chamber (4) and a second chamber (5);
a piston rod (7) connected to the piston, the piston having a head end;
a second fixing (8) connected to the piston rod, the second fixing for connection to a second vehicle part;
a connecting channel (13) located in the piston body and extending towards the piston rod, the connecting channel comprising a first outflow opening (17);
a seat (18) at a periphery around the piston;
a peripheral edge (21) located inwards of the periphery around the piston and adjacent to the first outflow opening (17);
a further connecting channel (14) located in the piston body and extending towards the piston rod, the further connecting channel comprising a second outflow opening (16); and
a plate valve (12) comprised of a metal part provided with an opening (15), the plate valve clamped against the head end of the piston, a free end (19) of the valve plate resting upon the seat (18), wherein,
said connecting channel and said further connecting channel provide fluid communication between opposite sides of the piston,
the plate valve is clamped such that i) on movement of first and second fittings towards each other, fluid flows through said connecting channel and further connecting channel when said plate valve opens, and ii) on movement of first and second fittings away from each other, said plate valve at least partially closes off the first and second outflow openings of said connecting channel and said further connecting channel,
in a rest position of said plate valve, said plate valve partially clears said first and second outflow openings with the free end of the valve plate resting upon the seat (18) with a space (20) present between the peripheral edge (21) and the plate valve, the space (20) providing a flow-through space (20) between said opening (15) of the plate valve and said first outflow opening (17) in said connecting channel (13).

10. Hydraulic shock absorber of claim 9, wherein,
on the movement of first and second fittings away from each other, said plate valve at least partially closes off the first and second outflow openings of said connecting channel and said further connecting channel, by the plate valve being forced in a direction of the peripheral edge (21) to ultimately close on the peripheral edge (21), thereby closing the flow-through space (20) and preventing the connecting channel (13) from conveying the fluid.

11. Hydraulic shock absorber of claim 10, wherein,
irrespective of a position of the plate valve (12) near the peripheral edge (21), the further connecting channel (14) is a constantly open channel always providing flow through said second outflow opening and the further connecting channel.

12. Hydraulic shock absorber of claim 10, wherein,
on the movement of first and second fittings towards each other, fluid flows through said connecting channel and said further connecting channel after said plate valve opens by the free end (19) of the plate valve coming away from the seat (18) thereby allowing the fluid to flow in two directions out from the connecting channel (13) including i) in a first direction through the flow-through space (20), and ii) in a second direction located apart from the flow-through space (20).

13. Hydraulic shock absorber, comprising:
a cylinder (2);
a first fixing (3) for connection of the cylinder to a first vehicle part;
a piston (6) which divides the cylinder into a first chamber (4) and a second chamber (5);
a piston rod (7) connected to the piston, the piston having a head end;
a second fixing (8) connected to the piston rod, the second fixing for connection to a second vehicle part;
connecting channels (13) located in the piston body and extending towards the piston rod, each connecting channel comprising a first outflow opening (17);
a seat (18) at a periphery around the piston;
a peripheral edge (21) located inwards of the periphery around the piston and adjacent to the first outflow openings (17);
further connecting channels (14) located in the piston body and extending towards the piston rod, each further connecting channel comprising a second outflow opening (16);
a plate valve (12) comprised of a metal part provided with openings (15), the plate valve clamped against the head end of the piston, a free end (19) of the valve plate resting upon the seat (18), wherein,
said connecting channels and said further connecting channels provide fluid communication between opposite sides of the piston,
the plate valve is clamped such that i) on movement of first and second fittings towards each other, fluid flows through said connecting channels and said further connecting channels when said plate valve opens, and ii) on movement of first and second fittings away from each other, said plate valve at least partially closes off the first and second outflow openings of said connecting channels and said further connecting channels,
in a rest position of said plate valve, said plate valve partially clears said first and second outflow openings with the free end of the valve plate resting upon the seat (18) with a space (20) present between the peripheral edge (21) and the plate valve, the space (20) providing a flow-through space (20) between said openings (15) of the plate valve and said first outflow openings (17) in said connecting channels (13).

14. Hydraulic shock absorber of claim 13, wherein,
on the movement of first and second fittings away from each other, said plate valve at least partially closes off the first and second outflow openings of said connecting channels and said further connecting channels by the plate valve being forced in a direction of the peripheral edge (21) to ultimately close on the peripheral edge (21) thereby closing the flow-through space (20) and preventing the connecting channels (13) from conveying the fluid.

15. Hydraulic shock absorber of claim 14, wherein,
irrespective of a position of the plate valve (12) near the peripheral edge (21), the further connecting channels (14) are constantly open channels always providing flow through said second outflow openings.

16. Hydraulic shock absorber of claim 13, wherein,
on the movement of first and second fittings towards each other, said plate valve opens by the free end (19) of the plate valve coming away from the seat (18) allowing the fluid to flow in two directions out from the connecting channels (13) including i) in a first direction through the flow-through space (20), and ii) in a second direction located apart from the flow-through space (20).

* * * * *